June 21, 1966 J. H. BROADHEAD ETAL 3,257,118
PIPE REPAIR JOINT
Filed June 4, 1962 2 Sheets-Sheet 1
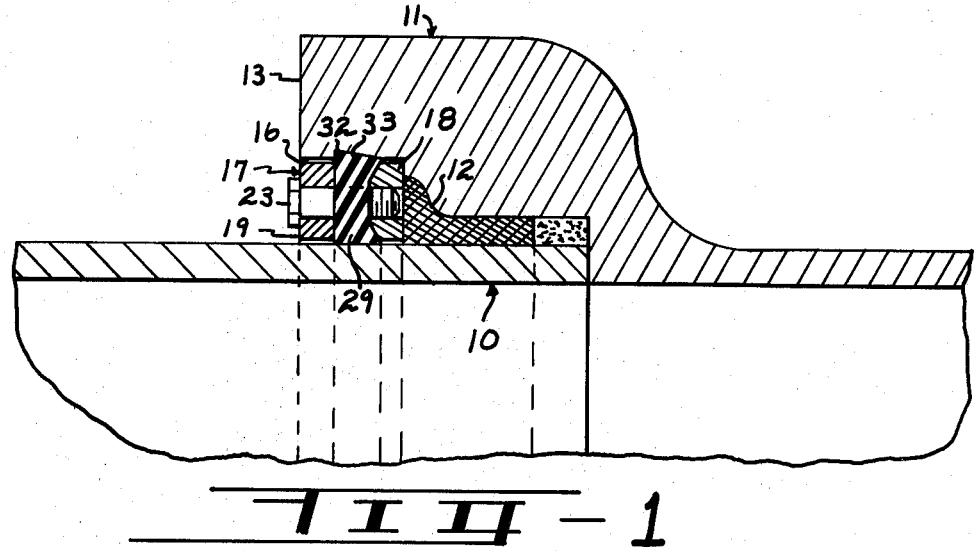
FIG-1
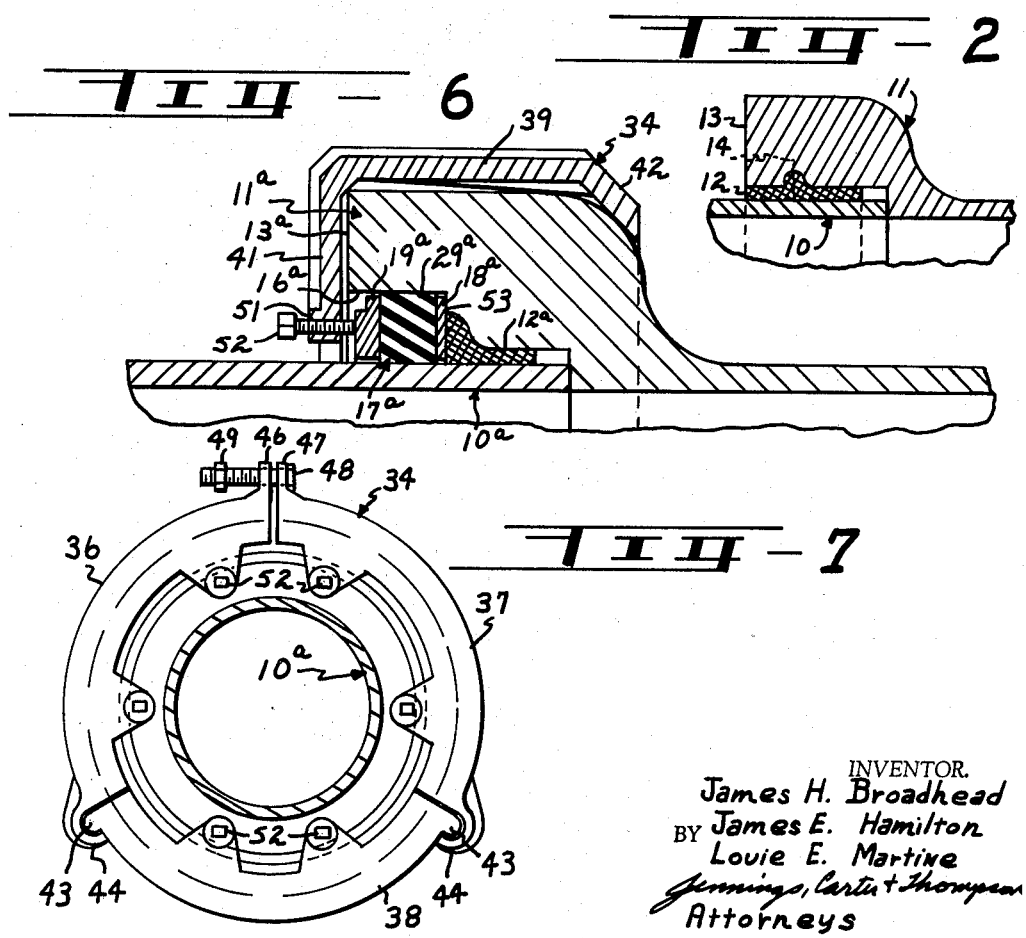
FIG-2
FIG-6
FIG-7
INVENTOR.
James H. Broadhead
BY James E. Hamilton
Louie E. Martine
Jennings, Carter + Thompson
Attorneys June 21, 1966  J. H. BROADHEAD ETAL  3,257,118
PIPE REPAIR JOINT
Filed June 4, 1962  2 Sheets-Sheet 2
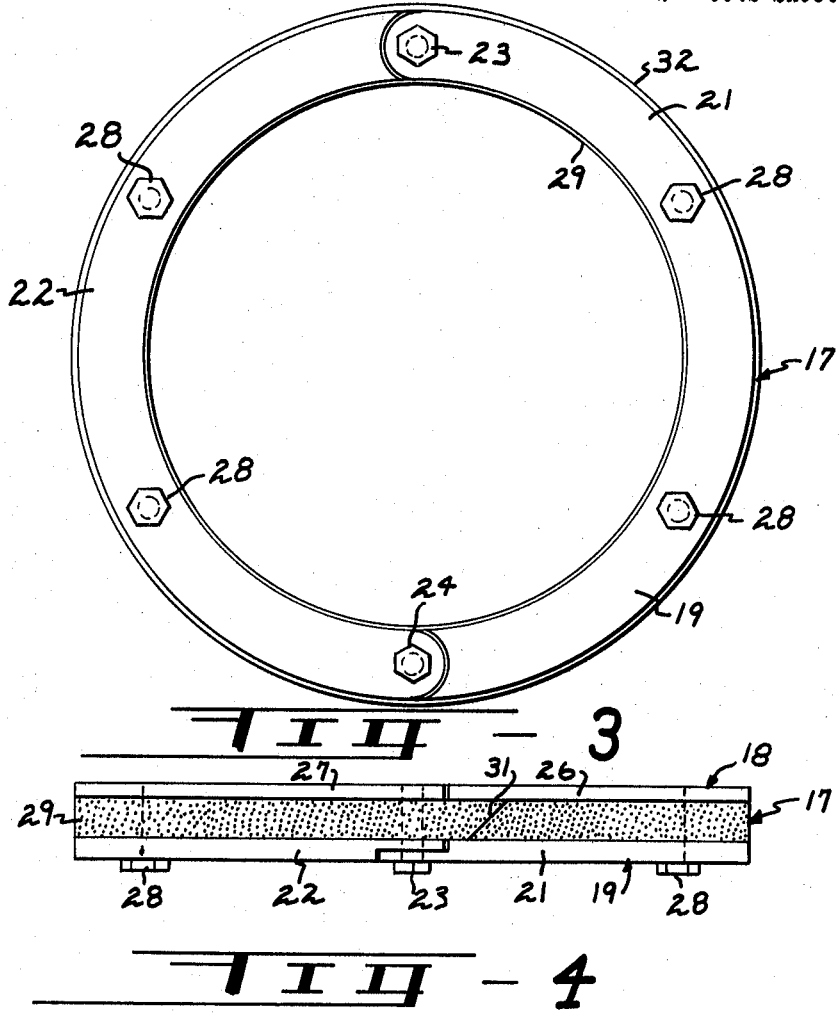
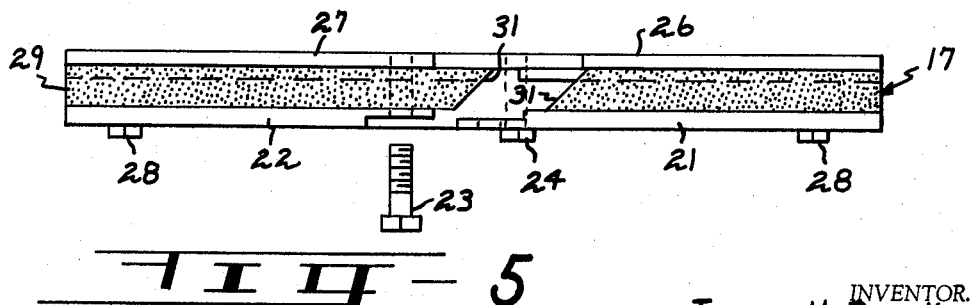
INVENTOR.
James H. Broadhead
BY James E. Hamilton
Louie E. Martine
Jennings, Carter + Thompson
Attorneys

United States Patent Office 3,257,118
Patented June 21, 1966

3,257,118
PIPE REPAIR JOINT
James H. Broadhead, James E. Hamilton, and Louis E. Martine, Birmingham, Ala., assignors, by direct and mesne assignments, to Utility Tool Company, a corporation of Delaware
Filed June 4, 1962, Ser. No. 199,737
4 Claims. (Cl. 277—101)

This invention relates to a pipe repair joint and more particularly to such a joint which permits pipe line joints to be repaired in situ and without having to separate the adjoining pipe sections.

An object of our invention is to provide a self-adjusting, flexible joint between an inner pipe section and a surrounding bell portion which shall also be adapted for use in the repair of pipe sections which are out of alignment with each other.

Another object of our invention is to provide a flexible joint between an inner pipe section and a surrounding bell portion which is not tied rigidly to either of the pipe sections that are joined to each other, thereby preventing breakage of the pipe sections and the means for joining the sections to each other.

Another object of our invention is to provide a flexible pipe joint and process for making the same which shall comprise a split gasket member which is clamped in position between the inner pipe section and an annular bell portion by split rings whereby pressure is applied only to the gasket and not to the pipe sections being joined.

Another object of our invention is to provide a pipe joint of the character designated which shall require the installation of a minimum of parts, thereby not only reducing the overall cost of materials, but also reducing the labor required to install the joint.

A further object of our invention is to provide a joint of the character designated in which a counterbore is made in the bell portion and concomitantly therewith the adjacent, old packing is cut away to provide an annular space between the bell portion and the inner pipe section for receiving a split packing unit which is inserted around the inner pipe section without separation of the inner pipe section from the outer bell portion.

A further object of our invention is to provide a joint of the character designated which shall be simple and inexpensive to install and one which does not require cement or the like for securing the gasket in place.

A still further object of our invention is to provide a joint of the character designated in which the outer surface of the inner pipe section inwardly of the bell portion is machined or cleaned at the time the counterbore is made in the surrounding bell portion.

Heretofore in the art to which our invention relates, various types of joints have been proposed for repairing pipe line joints. However, such joints have been unsatisfactory due to the fact that they require an excessive number of parts which are joined to each other. Also, the various types of clamps for the joints are connected mechanically and directly to the pipe sections by metal clamp members whereby upon exerting clamping pressure, excessive forces are applied not only to the clamping elements themselves, but to the pipe sections being joined, thereby causing breakage of the clamping elements and the pipe sections. Also, with prior art clamps, it has been necessary to clean the outside of the bell portion of the joined pipe sections due to the fact that the seal thus formed is dependent upon the manner in which the clamp engages the bell portion. Furthermore, as is well understood in the art to which our invention relates, old pipe lines were installed for conveying wet gases. Such wet gases kept the packing material between the bell portion and the inner pipe section in a swelled or expanded position whereby an effective seal was provided. However, with the present day usage of dry, natural gas, the packing soon deteriorates and shrinks whereby the packing no longer serves as an effective seal. Also, as is well understood, adjacent pipe sections tend to move relative to each other due to various reasons, such as temperature variations, and vibrations caused by traffic or the like.

To overcome the above and other difficulties, we remove the outer portion of the old packing and concomitantly therewith counterbore the inner surface of the surrounding bell portion to provide an annular space therebetween for receiving our improved sealing unit, which comprises a split annular gasket mounted between split ring members. After insertion of the split sealing unit within the annular passageway defined between the outer bell portion and the inner pipe section, the ring members are moved toward each other to expand the annular gasket radially, whereby the gasket moves into sealing engagement with the inner surface of the surrounding bell portion and the outer surface of the inner pipe section.

Pipe joints illustrating features of our invention are shown on the accompanying drawings, forming a part of this application, in which:

FIG. 1 is a fragmental, sectional view showing a completed joint;

FIG. 2 is a vertical sectional view, drawn to a smaller scale, showing the manner in which the inner and outer pipe sections are joined to each other prior to repairing the same in accordance with our invention;

FIG. 3 is a front elevational view showing the split, packing unit removed from the pipe sections;

FIG. 4 is a top plan view of the split, packing unit shown in FIG. 3;

FIG. 5 is a top plan view of the split packing unit showing one of the securing members removed and the packing unit partially opened;

FIG. 6 is a fragmental sectional view showing a modified form of joint wherein the split rings are moved toward each other by members positioned outwardly of the split packing unit; and, FIG. 7 is a front elevational view of the apparatus shown in FIG. 6 drawn to a smaller scale.

Referring now to the drawings for a better understanding of our invention, we show an inner pipe section 10 which is surrounded by an outer pipe section having a bell portion 11 unitary therewith. That is, the pipes which are joined to each other are provided with the usual spigot ends or inner pipe sections 10 and the usual outer pipe sections having unitary bell portions 11. In FIG. 2 of the drawings, we show the manner in which the inner pipe section is joined to the outer pipe section prior to repair in accordance with our invention. That is to say, the inner pipe section 10 telescopes within the bell portion 11 in the usual manner and an annular packing, such as lead or the like, seals the space between the inner pipe section 10 and the bell portion 11.

To repair the joint between the inner pipe section 10 and the bell portion 11, the interior of the bell portion 11 is counterbored to provide an enlarged counterbore adjacent the end face 13 of the bell portion along the dotted line 14, as shown in FIG. 2. Concomitantly with the counterboring of the interior of the bell portion 11, the portion of the annular packing 12 adjacent the end face of the bell portion which is positioned radially inwardly of the counterbore is removed. The counterbore is preferably made by a rotating cutter element which is of a width to remove the entire outer end portion of the annular packing 12 and at the same time make a counterbore on the interior of the bell portion adjacent the end face 13 thereof. At the time the counterbore is made, the outer surface of the inner pipe section 10 which is positioned within the confines of the counterbore is machined or cleaned by the cutting tool whereby a smooth uninterrupted surface is provided along the outer surface of the inner pipe.

The counterbore along the dotted line 14 thus leaves an annular space or passageway 16 between the outer surface of the inner pipe section 10 and the inner surface of the bell portion 11 for receiving our improved split, packing unit 17. As shown in FIGS. 1 and 3–5, the split, packing unit comprises an inner split ring 18 and an outer split ring 19. The split ring 19 is provided with separate sections 21 and 22 which are pivotally connected to each other at one side of the packing unit by a cap screw or bolt 23. The other ends of the sections 21 and 22 are pivotally connected to each other by a cap screw or bolt 24.

The inner split ring 18 is divided into separate sections 26 and 27 which are pivotally connected to each other at one side of the packing unit by the cap screw or bolt 23. The other ends of the sections 26 and 27 are pivotally connected to each other by the cap screw or bolt 24. As shown in FIG. 1, the ring 18 is provided with threaded openings for receiving the bolts 23 and 24 while suitable openings are provided through the split ring 19 for receiving the bolts 23 and 24. Other angularly spaced cap screws or bolts 28 pass through suitable openings in the split ring 19 and engage threaded openings in the split ring 18 whereby the split rings 18 and 19 are connected to each other at angularly spaced points.

Positioned between the split rings 18 and 19 is an annular, split gasket 29 which is formed of a resilient material, such as neoprene, rubber or the like. The free ends of the split gasket 29 are cut on a bevel as at 31 whereby they abut each other, as shown in FIG. 4, to provide an air-tight joint therebetween after assembly. Suitable openings are provided through the gasket 29 for receiving the bolts 23, 24 and 28.

As clearly shown in FIG. 1, the outer surface of the split gasket 29 is provided with a raised portion 32 which is adapted to engage a circumferential groove 33 formed along the interior surface of the bell portion 11 after the same is counterbored. By providing the circumferential groove 33 within the inner surface of the bell portion 11 and the outwardly projecting portion 32 on the split gasket 29, the gasket 29 is held in position temporarily until the split rings 18 and 19 can be forced toward each other to expand the gasket into sealing engagement with the outer surface of the inner pipe section 10 and the inner surface of the bell portion 11. That is to say, upon tightening the bolts 23, 24 and 28, the split rings 18 and 19 are forced toward each other, thus expanding the annular gasket 29 radially into sealing engagement with the inner pipe section 10 and the bell portion 11.

From the foregoing description, the manner in which our improved joint is made will be readily understood. The interior of the bell portion 11 is counterbored by suitable means whereby the entire outer portion of the annular packing 12 is removed to provide an annular space between the outer surface of the inner pipe section 10 and the inner surface of the bell portion 11. At the same time, the outer surface of the inner pipe section 10 is machined or cleaned to thus provide smooth contact surfaces for engagement with the resilient gasket 29.

To insert the packing unit 17, the split rings 18 and 19 and the annular split gasket 29 may be inserted separately. However, it is preferable to secure the split rings 18 and 19 to each other with the gasket 29 therebetween by the bolts 24 and 28. The bolt 23 is removed whereby the entire packing unit 17 may be inserted around the inner pipe section 10 while it is still within the bell portion 11.

After the split packing unit 17 is inserted around the inner pipe section 10, the bolt 23 is inserted through the openings in the split ring 19 and the gasket 29 and is then threaded into the threaded opening in split ring 18. The entire packing unit 17 is then forced within the annular passageway 16 defined between the inner pipe section 10 and the inner surface of the bell portion 11. As the gasket 29 is moved inwardly of the bell portion 11, the enlarged diameter portion 32 snaps into the circumferential groove 33 whereby the resilient gasket 29 holds the packing unit 17 temporarily in position. The bolts 23, 24 and 28 are then all tightened whereby uniform pressure is exerted to force the split rings 18 and 19 toward each other whereupon the annular, split gasket 29 expands radially into sealing engagement with the outer surface of the inner pipe section 10 and the inner surface of the bell portion 11.

Referring now to FIGS. 6 and 7 of the drawings, we show a modified form of our invention wherein the means for forcing the inner and outer split rings toward each other to expand the resilient gasket is mounted outwardly of the split packing unit. The repair joint is adapted for use in sealing a joint between an inner pipe section $10^a$ and a bell portion $11^a$ having an annular packing $12^a$ therebetween. The interior of the bell portion $11^a$ is counterbored and at the same time the outer end portion of the annular packing $12^a$ is cut away, as shown in FIG. 6, to thereby provide an annular passageway or space $16^a$ between the outer surface of the inner pipe section $10^a$ and the inner surface of the bell portion $11^a$. A split packing unit $17^a$, comprising an inner split ring $18^a$, an outer split ring $19^a$ and a split, annular gasket $29^a$ therebetween, is inserted within the annular passageway or space $16^a$.

Surrounding the bell portion $11^a$ is an annular clamp 34 which comprises three separate sections 36, 37 and 38, each of which comprises a base portion 39, and inwardly extending flanges 41 and 42. The inwardly extending flange 41 is adapted to extend inwardly alongside the inner face $13^a$ of the bell portion $11^a$ while the flange 42 is adapted to engage the other end of the bell portion $11^a$, as shown in FIG. 6. The ends of the clamp section 38 are provided with outwardly extending projections 43 which are in position to be engaged by hook-like portions 44 carried by the clamping sections 36 and 37, as shown in FIG. 7. The ends of the clamping sections 36 and 37 opposite the hook portions 44 are provided with outwardly projecting lugs 46 and 47 having suitable openings therethrough for receiving a securing bolt 48 having a nut 49. Accordingly, the clamping sections 36, 37 and 38 may be readily assembled around the bell portion $11^a$ by merely inserting the projections 43 in the hook portions 44 and then securing the other ends of the clamping sections 36 and 37 to each other by the retaining bolt 48. A single bolt 48 thus retains the entire clamping unit in place about the bell portion $11^a$.

The inwardly extending flanges 41 of the clamping sections 36, 37 and 38 are provided with threaded openings 51 for receiving threaded cap screws 52 which are adapted to engage the outer surface of the outer split ring $19^a$, as shown in FIG. 6. Accordingly, upon turning the threaded cap screws 52 in a direction to move the same inwardly toward the split clamping unit $17^a$, the outermost ring $19^a$ is forced inwardly toward the split ring $18^a$ whereby the resilient gasket $29^a$ is expanded radially into sealing engagement with the inner surface of the bell portion $11^a$ and the outer surface of the inner pipe section $10^a$.

Axial movement of the inner split ring 18 is limited by its engagement with a radially extending machined surface 53 defined at the bottom of the counterbore in the outer bell portion $11^a$. The machined surface 53 is also in radial alignment with the outer surface of the packing $12^a$ after the same is cut away, as shown in FIG. 6. The annular packing member $12^a$ will not form a suitable stop or retaining element for the inner split ring 18ᵃ due to the fact that the packing 12ᵃ is often deteriorated and slips within the recess between the inner pipe section 10ᵃ and the bell portion 11ᵃ. Accordingly, we provide the machined, annular surface 53 outwardly of the annular packing 12ᵃ whereby a firm seat is provided to limit axial movement of the split ring 18ᵃ and the remainder of the split packing unit 17ᵃ.

From the foregoing, it will be seen that we have devised an improved pipe repair joint. By providing a resilient, sealing unit between the inner pipe section and the outer bell portion which may be installed while the inner pipe section is in place within the outer bell portion, we greatly reduce the overall cost of the joint and the labor required to install the same. Also, by providing a split packing unit which may be readily inserted about the inner pipe section and then installed within the space defined between the inner pipe section and the outer bell portion by merely tightening a series of tightening elements which force inner and outer split rings of the packing unit toward each other to expand the annular gasket radially into sealing position, there is no rigid connection or metal-to-metal contact between the packing unit and the adjacent portions of the pipe sections being joined, thereby eliminating strain on the packing unit and the sections of pipe being connected. Furthermore, by providing a machined surface at the bottom of the counterbore in the bell portion, a machined seat is provided for the innermost split ring whereby it is held in proper position and held against axial movement inwardly of the bell portion.

While we have shown our invention in two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. In a repair joint between an inner pipe section and an outer pipe section, said outer pipe section having a bell portion unitary therewith fitting over the inner pipe section with an annular packing therebetween,
    (a) there being an enlarged counterbore in the interior of said bell portion adjacent the end face of said bell portion terminating said annular packing in spaced relation to and inwardly of the end face of said bell portion with an annular recess between said bell portion and said inner pipe section,
    (b) radially aligned, annular faces on said bell portion and said annular packing at the inner end of said counterbore,
    (c) an inner split ring within said annular recess between said bell portion and said inner pipe section and disposed to encircle said inner pipe section adjacent said radially aligned annular faces while said inner pipe section is within said bell portion,
    (d) an outer split ring between said bell portion and said inner pipe section and disposed to encircle said inner pipe section while said inner pipe section is within said bell portion,
    (e) an annular split gasket between said inner split ring and said outer split ring and disposed to encircle said inner pipe section while said inner pipe section is within said bell portion,
    (f) and means forcing the split rings toward each other to expand said gasket radially into sealing engagement with the inner surface of said bell portion and the outer surface of said inner pipe section.

2. In a repair joint between an inner pipe section and an outer pipe section as defined in claim 1 in which the means forcing the split rings toward each other comprises angularly spaced bolts extending through said split rings and said split annular gasket and operatively connecting said split rings to each other.

3. In a repair joint between an inner pipe section and an outer pipe section as defined in claim 1 in which the means forcing the split rings toward each other comprises:
    (a) an annular member having sections detachably connected to each other and disposed to encircle the bell portion while said inner pipe section is in place within said bell portion,
    (b) means detachably connecting said annular member to said bell portion,
    (c) an inwardly and radially extending flange carried by said annular member and disposed to extend alongside the end face of said bell portion,
    (d) and angularly spaced threaded members carried by said flange and extending inwardly into engagement with said outer split ring in position to urge said outer split ring toward said inner split ring whereby said inner split ring engages said radially aligned faces and said gasket between said outer and inner split rings is expanded radially into sealing engagement with the inner surface of said bell portion and the outer surface of said inner pipe section.

4. In a repair joint between an inner pipe section and an outer pipe section as defined in claim 1 in which the outer split ring and said annular gasket are provided with angularly spaced openings therethrough and bolts extend through said openings and said inner split ring is provided with angular spaced threaded openings receiving the threaded ends of said bolts whereby said split rings are drawn toward each other.

References Cited by the Examiner

UNITED STATES PATENTS

| 1,777,564 | 10/1930 | Hosmer | 285—139 |
| 1,979,680 | 11/1934 | Engel | 277—101 |
| 2,197,450 | 4/1940 | Curtis | 285—337 X |
| 2,220,986 | 11/1940 | Bartell | 277—104 |
| 2,239,307 | 4/1941 | Weber | 277—101 X |
| 2,378,525 | 6/1945 | Abegg | 29—401 |
| 2,660,778 | 12/1953 | Gerner | 29—401 |
| 2,982,569 | 5/1961 | Miller et al. | |
| 3,002,772 | 10/1961 | Schustack | 277—104 |
| 3,045,830 | 7/1962 | Fulton | 285—139 X |

FOREIGN PATENTS

| 52,283 | 9/1936 | Denmark. |
| 654,341 | 6/1951 | Great Britain. |
| 279,037 | 3/1952 | Switzerland. |

References Cited by the Applicant

FOREIGN PATENTS 565,520    11/1923    France.

LAVERNE D. GEIGER, *Primary Examiner.*

CARL W. TOMLIN, EDWARD V. BENHAM, M. CARY NELSON, *Examiners.*

S. MILLER, L. RANEY, H. KLINKSIEK,
*Assistant Examiners.*